United States Patent [19]

Burkit

[11] Patent Number: 5,388,868
[45] Date of Patent: Feb. 14, 1995

[54] CIRCULAR COUPLING SYSTEM

[76] Inventor: John W. Burkit, P.O. Box 19, Kempton, Pa. 19529

[21] Appl. No.: 246,183

[22] Filed: May 19, 1994

[51] Int. Cl.⁶ ............................................. F16L 25/00
[52] U.S. Cl. ................................... 285/177; 285/237
[58] Field of Search ............... 285/237, 177, 370, 351, 285/109, 236, 397

[56] References Cited

U.S. PATENT DOCUMENTS

| | | | |
|---|---|---|---|
| 3,406,988 | 10/1968 | Jones | 285/237 X |
| 4,746,127 | 5/1988 | Westhoff | 285/237 X |
| 4,927,189 | 5/1990 | Burkit | 285/370 X |
| 4,955,641 | 9/1990 | Dent | 285/237 X |
| 4,997,212 | 3/1991 | Burkit | 285/370 X |
| 5,092,633 | 3/1992 | Burkit | 285/370 X |
| 5,201,550 | 4/1993 | Burkit | 285/370 X |

FOREIGN PATENT DOCUMENTS

| | | | |
|---|---|---|---|
| 496522 | 7/1992 | European Pat. Off. | 285/237 |
| 1444078 | 7/1976 | United Kingdom | 285/237 |
| 2214255 | 8/1989 | United Kingdom | 285/237 |

OTHER PUBLICATIONS

On sale disclosure, AWWA Convention, San Antionio, Tex. Jun. 6, 1993.
Sales offer to customers bt licensee (VALCO), letter with brochure, Apr. 29, 1994.

Primary Examiner—Dave W. Arola
Attorney, Agent, or Firm—William B. Noll

[57] ABSTRACT

Invention is directed to a circular coupling for joining a first tubular member to a second member, where the second member may be a tubular member larger than the first, or a manhole. Specifically, the first end of the coupling is adapted to encircle the first tubular member and a second end thereof is adapted to be received within a complementary opening in the second member. The coupling comprises an elongated open ended tubular joint member formed of a relatively rigid sheet-like member or members, where opposing sheet ends overlap such that the end portions lie contiguous with each other. Within the joint member is a continuous sleeve formed of an elastomeric material contiguous with the inner surface of the tubular joint member and extending from the first end toward and wrapped around the second end. The sleeve near said first end, further includes at least one continuous upstanding annular rib to be compressed about the tubular member, while near the other end at least one continuous upstanding external rib is provided to be compressed against the complementary opening of the second member. Finally, means are provided for changing the diameter of the tubular joint member, where the means includes a first member for incrementally decreasing the diameter of the first end to compress the coupling about the tubular member, and a second member for incrementally increasing the diameter of the second end to compress the coupling against the complementary opening of the second member.

9 Claims, 3 Drawing Sheets

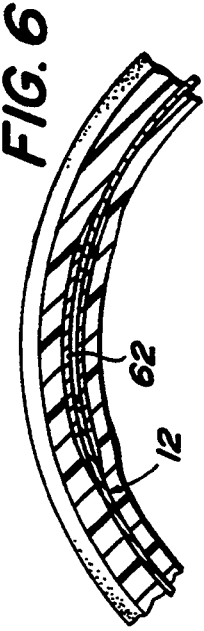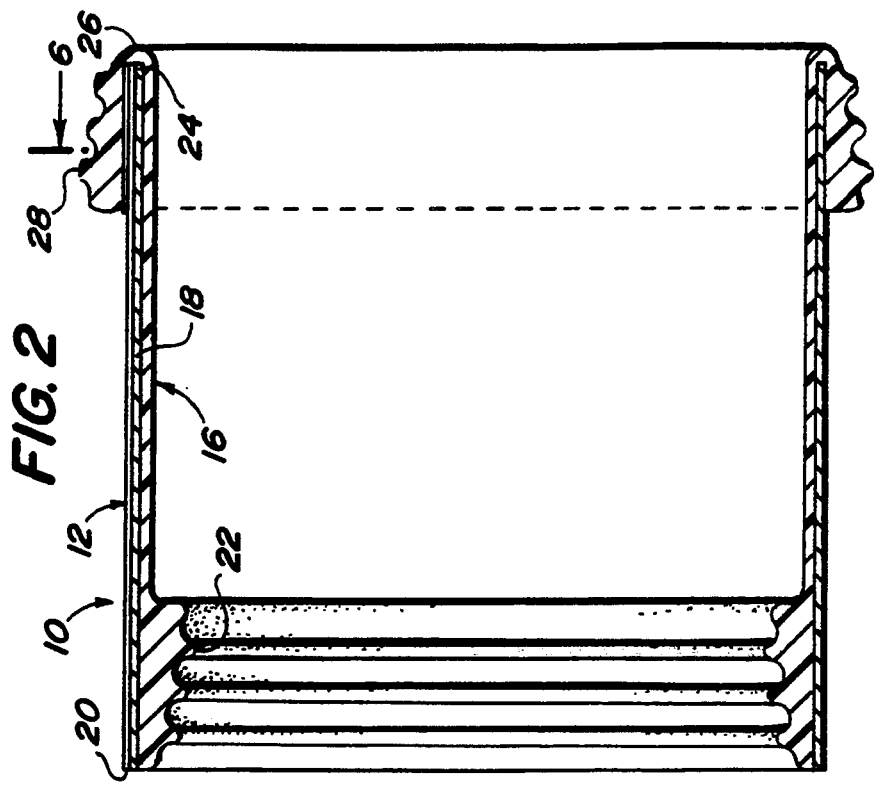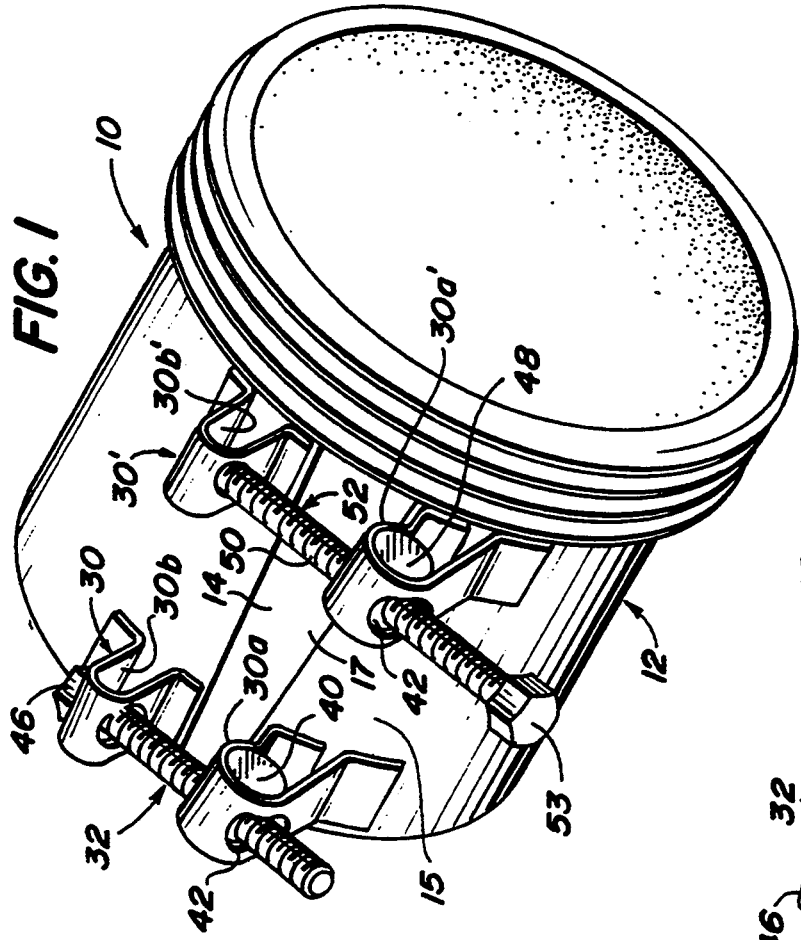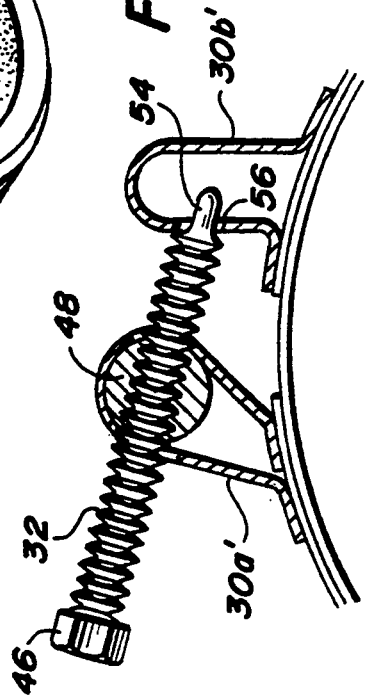

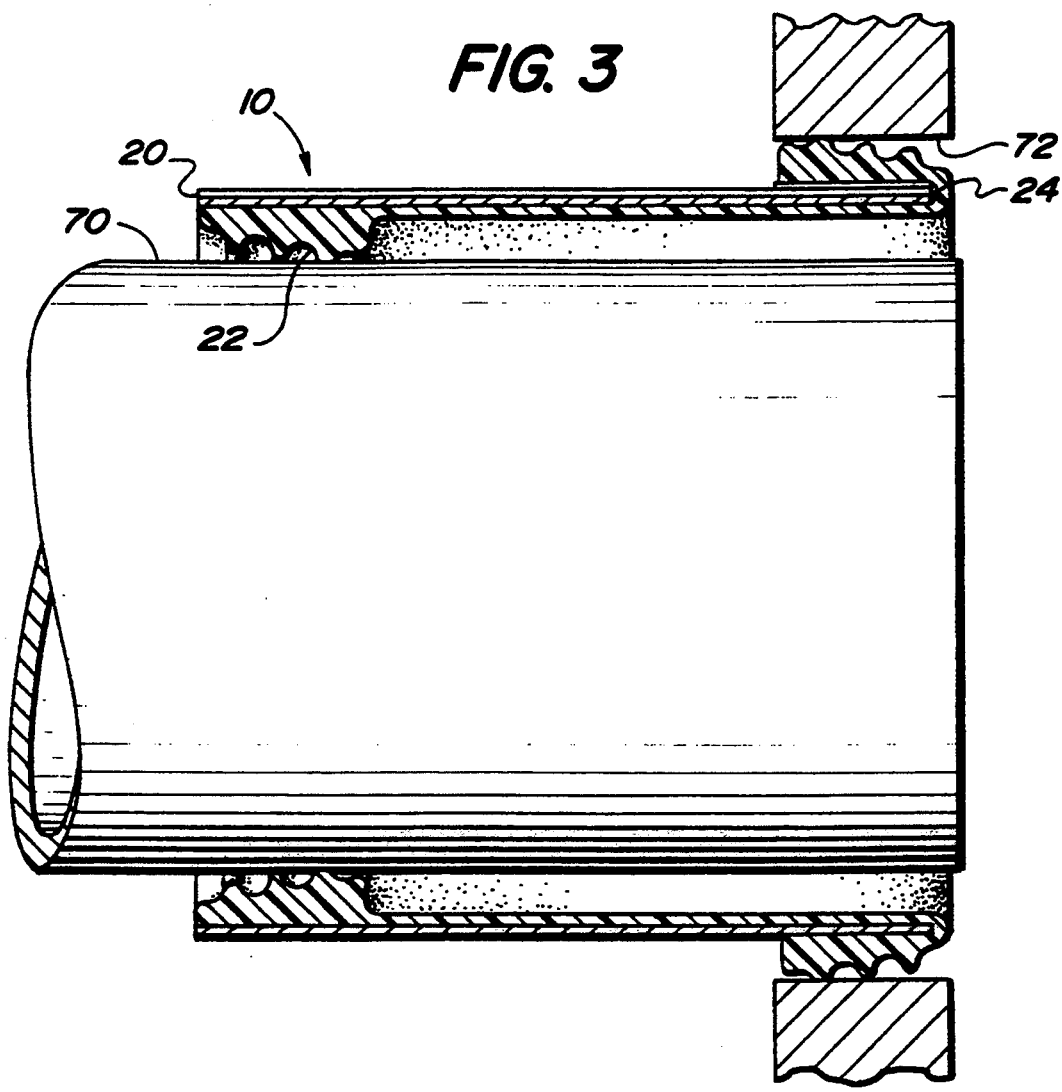
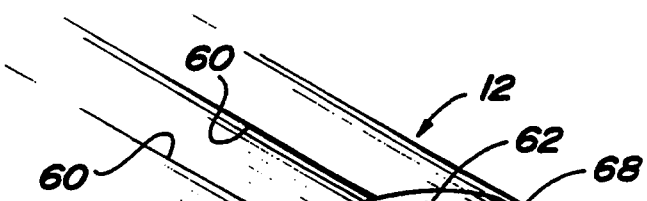

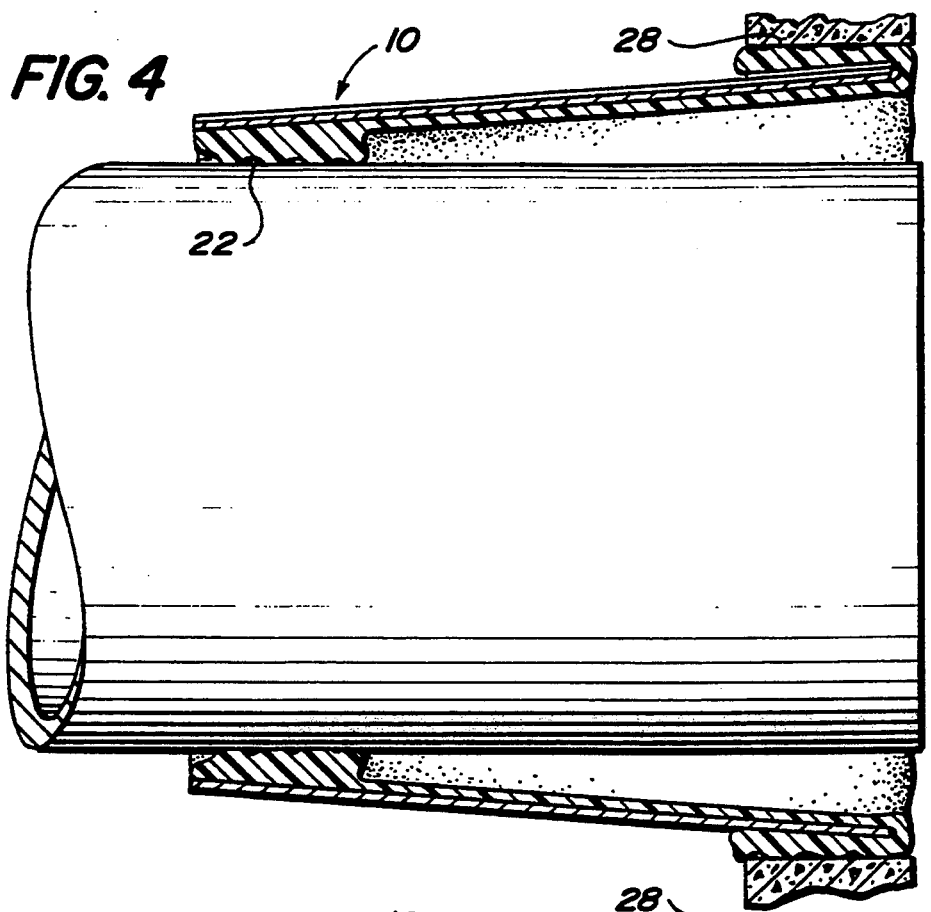
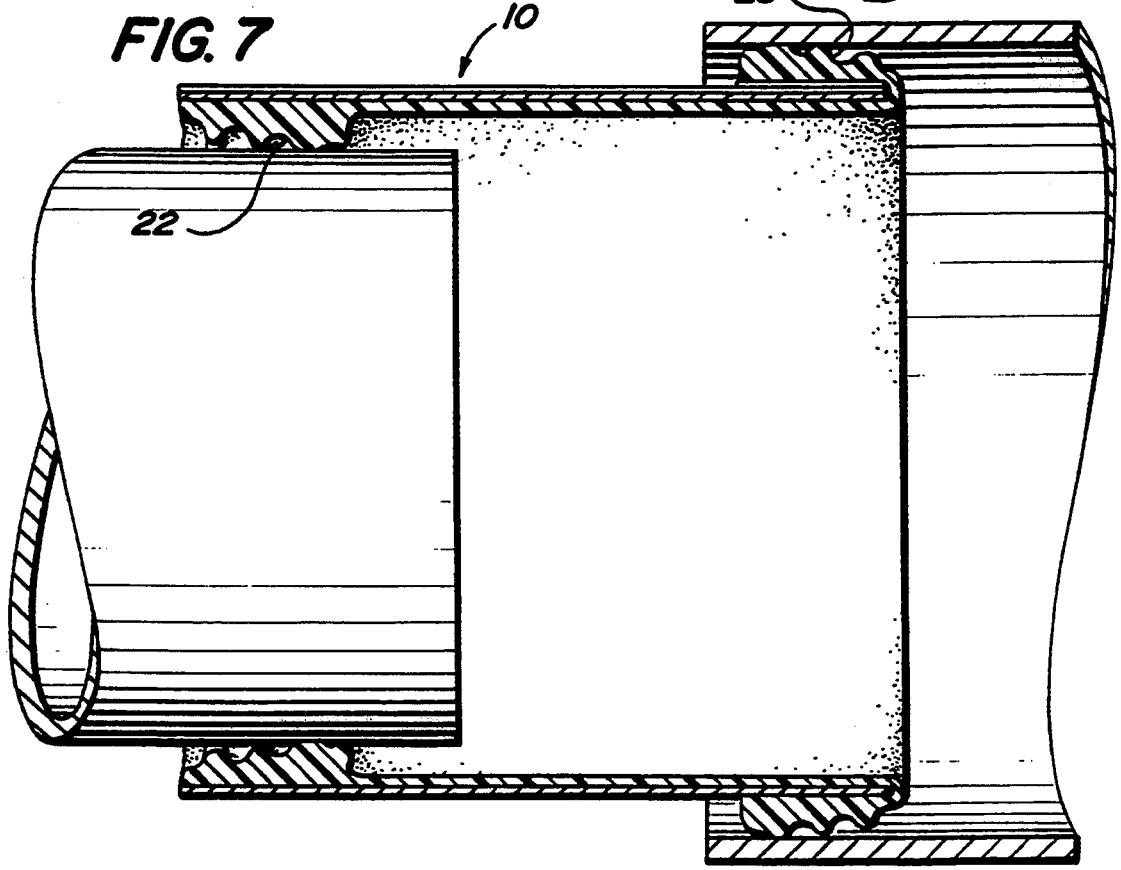

CIRCULAR COUPLING SYSTEM

BACKGROUND OF THE INVENTION

This invention is directed to a circular coupling system of the type for joining a tubular member, such as a pipe, to a second member, which may be a pipe of a different diameter, or a precast concrete manhole, for example.

There is a growing concern today for a greater protection of the environment. This is evident by the imposition of numerous laws and regulations dealing with the air and clean water. The EPA is looking into the infiltration/exfiltration (I/E) rates of our nations's sewer systems. The United States has millions of miles of sound sewer pipe jointed with cement mortar or asphalt that shrinks or cracks. This and other defects allow excessive infiltration into the system, causing problems in the treatment of sewage or exfiltration in close proximity to water supply lines and streams, both I/E become a threat to the quality of our water supply.

U.S. Pat. No. 4,927,189, to the inventor hereof, the first of a series of patents directed to an internal expansion coupling, in its preferred embodiment, is directed to a coupling system for use in joining together a pair of pipes aligned in end-to-end relationship. The coupling thereof includes an elongated open ended tubular member formed of a relatively rigid sheet-like member, such as steel sheet, where the sheet ends overlap such that the end portions lie contiguous with each other. A continuous sleeve, formed of an elastomeric material, overlaps the sheet side about at least one open end of the tubular member. The sleeve, about the circumference thereof, is provided with at least one continuous upstanding rib, which is adapted to lie adjacent to and be compressed against the inside wall of a pipe. Finally, means are provided for expanding the sheet-like member whereby the sheet ends move circumferentially towards one another urging the elastomeric sleeve and the rib against the inside wall of the pipe. The added pressure from the flowing medium therethrough only serves to enhance the coupling joint.

While the invention of '189 represented an effective approach to joining two aligned pipes with essentially the same diameter, a need continues for a coupling system which can be adapted to join pipes of different diameters, and to a system which can join a pipe to a designated hole in a concrete manhole, for example.

U.S. Pat. No. 5,261,761, to Knappert et al., teaches a manhole adapter, formed of a resin (ABS). The ABS material is formed into a coupling-collar, by creating a cylindrical body having an outside diameter surface structure formed into multiple adjacent rib-grooves, which subsequently receive portions of grout to create a strong bond between the grout and the ABS manhole adapter. Additionally, the cylindrical body is provided with a rib-groove to receive a circular continuous resilient seal, which, when installed, bears against a PVC sewer pipe. This sealing between the PVC sewer pipe coupled with the grout sealing between the cylindrical body and the manhole, creates the overall sealing of the installed ABS manhole adapter. It is claimed that this coupling-collar serves well in making a connection between a pipe and a manhole. However, since the coupling-collar cannot be expanded or contracted, the sealing is by means of a friction fit or stab type joint, and by the effectiveness of the grouting used between the coupling-collar and designated hole in the manhole. Any relative movement between the manhole and pipe, such as through back filling or earth settlement, can easily damage the grouting and the effectiveness of the sealing provided thereby.

U.S. Pat. No. 4,478,437, to Skinner, represents another approach in providing a coupling between a pipe and a hole in the wall of a manhole. The invention thereof relates to a radially expandable locking sleeve which includes a cylindrical relatively stiff but resiliently flexible split strip of metal having opposed abuttably engageable ends. The sleeve is movable between two positions in which the end portions thereof may first be radially overlapped and secondly may be interlockingly engaged end-to-end. Means are provided for locking the end portions in end-to-end relation, such means including radially overlapped portions on each of the sleeve ends, which have outer peripheral surfaces that lie in and extend over an extended area substantially coincident with the outer cylindrical surface of the sleeve. The overlapped portions include abuttable portions which are both laterally and circumferentially engageable to hold the ends against lateral displacement and against circumferential movement toward each other. Further, the coupling device includes provision for the use of a tubular gasket of elastomeric material in combination with the expandable locking sleeve.

The device of Skinner, like that of Knappert et al., is not without its shortcomings. The elastomeric gasket, for example, is exposed to rocks, stones and other debris that can puncture and damage same during a backfilling operation. Further, a special hydraulic tool is required to expand the split sleeve from a first position to a second position. The patentee employs a hose type compression clamp about the pipe to be joined to the manhole. With obvious limits on how much force can be applied about the pipe, an effective seal is questionable.

The present invention avoids the problems of the prior art by the provision of an incrementally expandable and contractual coupling arrangement that provides effective sealing between the respective members to be coupled. The novel features of this invention will become apparent to those skilled in the art from a reading of the following specification, particularly when read in conjunction with the accompanying drawings.

SUMMARY OF THE INVENTION

The present invention relates to a circular coupling for joining a tubular member, such as a pipe, to a second member, such as a second pipe of a different diameter, or a manhole, where a first end of the coupling is adapted to encircle the tubular member and a second end thereof is adapted to be received within a complementary opening in the second member. The coupling comprises an elongated open ended tubular joint member preferably formed of a relatively rigid sheet-like member, where opposing sheet ends overlap such that the end portions lie contiguous with each other. As part of the tubular joint member, a continuous sleeve, formed of an elastomeric material, lies contiguous with the inner surface of the tubular joint member and extends from the first end toward and wrapped around the second end, where the sleeve near the first end includes at least one continuous upstanding annular rib to be compressed about the tubular member, and the sleeve near the second end includes at least one continuous upstanding external rib to be compressed against the complementary opening of the second member. Finally means are provided for changing the diameter of the tubular joint member. The means include a first member for incrementally decreasing the diameter of the first end to compress the coupling about the tubular member, and a second member for incrementally increasing the diameter of the second end to compress the coupling against the complementary opening of the second member.

BRIEF DESCRIPTION OF THE DRAWINGS

FIG. 1 is a perspective view of the circular coupling system according to the present invention.

FIG. 2 is a longitudinal sectional view of the coupling system of FIG. 1.

FIG. 3 is a sectional view, similar to FIG. 2, illustrating the coupling system hereof between a tubular member, such as a pipe, and a hole in the wall of a precast concrete manhole member, by way of example, prior to securing the coupling system between such members.

FIG. 4 is a sectional view illustrating the coupling system of this invention effecting sealing between the tubular member and manhole of FIG. 3.

FIG. 5 is a partial perspective view of the coupling system hereof, without the encircling elastomeric gasket, to illustrate the preferred use of a bridging member to underlie said elastomeric gasket.

FIG. 6 is a partial sectional view taken along line 6—6 of FIG. 2, while further illustrating the bridging member of FIG. 5.

FIG. 7 is a sectional view, comparable to FIG. 3, showing the coupling system hereof joining a pair of tubular members, such as pipes, where said members exhibit different diameters.

FIG. 8 is an enlarged sectional view of one of the threaded members arranged on the coupling system to effect a change in diameter thereof.

DETAILED DESCRIPTION OF THE PREFERRED EMBODIMENTS

The present invention relates to an externally operable circular coupling system of the type for joining a tubular member, such as a pipe, to a second member, which may be a pipe of a different diameter, or a precast, concrete manhole, for example, FIGS. 7 and 3, respectively.

Turning now to the further Figures, FIGS. 1 and 2 illustrate the coupling system 10 of this invention. The coupling system comprises an essentially rectangular planar member, preferably sheet steel, formed into a circular configured member 12 with the sheet ends 14 overlapping and contiguous with one another. As an alternative, the preferred single sheet member may comprise a first C-shaped member 15 with a second arcuate shaped member 17 spot welded or otherwise fastened to one sheet of the C-shaped member to form the circular configured member 12. As best seen in FIG. 2, the circular member 12 includes a circular elastomeric sleeve 16 extending through the interior thereof and contiguous with the inner wall 18. At a first end 20 of the coupling system, the elastomeric sleeve 16 includes plural, inwardly directed, continuous ribs 22, where the ribs 22 may be uniform. As a preferred embodiment, the ribs increase in height from the inner wall 18, from the first end 20 toward the opposite or second end 24. In a similar fashion, the elastomeric sleeve 22 is wrapped 26 around said second end and terminates in a plurality of externally directed ribs 28. In a preferred embodiment, the ribs 28 increase in height from the end 24 toward the first end 20.

To effect changing of the diameter of the respective ends 20,24 of the coupling system hereof, for reasons to be explained hereinafter, each end is provided with a pair of brackets 30,30' one each fixedly secured to each sheet end 14, such as by spot welding, where said brackets include a threaded member 32 and a complementary, captured threaded nut member 40, illustrated in FIGS. 1 and 8. It will be recalled that a feature of this invention is the ability of the coupling system hereof to join two members, such as different diameter pipes, for example, where the end of such coupling system fits within one pipe and the other end is arranged to encircle the second or smaller pipe. This requires that the coupling system be adjustable, that is expandable at one end and compressible at the other. The preferred means to accomplish this is illustrated in FIGS. 1 and 8. Considering first the end 20 of the coupling system, where the coupling system is to be compressed about a tubular member, the pair of brackets 30 includes a first bracket having a captured threaded nut member 40 into and through which the shank 42 of threaded bolt member 32 is received. Such threaded bolt member 32 further includes a headed end 46, such that by a clockwise turning of the threaded bolt member 32, the respective brackets 30 are brought together, i.e. drawing bracket 30a toward bracket 30b, and the coupling system compressed about and against the wall of a contained tubular member, not shown.

The other or expandable pair of brackets 30a' and 30b', as illustrated in section in FIG. 8, includes bracket 30a' having a captured threaded nut member 48 through and into which the shank 50 of threaded bolt member 52 is received. The shank 50 at one end includes a head 53 by which the member 52 may be turned, while the other end includes a nipple or extension 54 that is rotatably received in a complementary hole 56 in bracket 30b'. By rotating or turning the threaded bolt member 52 in a clockwise fashion, the respective brackets 30a' and 30b' are incrementally and continuously further separated until sufficient pressure is brought to bear against the member, such as a pipe or manhole opening, to secure a sound fluid type seal, see FIGS. 3 and 4 for the manhole application, and FIG. 7 for a pipe application.

FIGS. 5 and 6 represent a preferred treatment for the coupling end 24 about which the elastomeric sleeve 16 is wrapped. Since the respective sheet ends 14 overlap there results a shoulder 60 that moves or shifts relative to the elastomeric sleeve 16 during expansion of the coupling system 10. To avoid any snags or damage to the elastomeric sleeve, and to provide a smoother transition to the respective sheet ends 14, a thin overriding bridging member 62 may be provided. The bridging member 62, arcuate in configuration to overlie and lie contiguous with the circular member 12, may be spot welded at one end thereof to the sheet end 14, with the other end 68 free to slide over the surface of member 12.

Since the function of the coupling system 10 is identical, whether used to join a pipe to a second pipe of a different diameter, or to a hole in a manhole, description of one shall suffice for the other. FIGS. 3 and 4 illustrate the latter application. In the relaxed state for the coupling system, as seen in FIG. 3, the end 20 is arranged to slidably receive a pipe 70 with the ribs 22 in light or limited contact with the outer wall of pipe 70. The opposite end of the coupling system 10, suitably contracted, is inserted into a complementary hole 72 in the wall of a manhole, for example. When the coupling system is properly positioned, the respective threaded members are activated to expand and contract, as appropriate, to effect a seal between the coupling system 10 and the respective members to which it is coupled. FIG. 4 illustrates the manner by which the shape or cross-section of the coupling system changes when placed in seating engagement with said respective members. At each end, the ribs 22,28 are compressed in intimate contact with the walls of said respective members. By this arrangement an effective fluid tight seal is obtained.

I claim:

1. A circular coupling for joining a tubular member to a second member, where a first end of said coupling is adapted to encircle said tubular member and a second end thereof is adapted to be received within a complementary opening in said second member, said coupling comprising
   (a) an elongated open ended tubular joint member formed of a relatively rigid sheet-like member, where opposing sheet ends overlap such that the end portions lie contiguous with each other;
   (b) a continuous sleeve formed of an elastomeric material contiguous with the inner surface of said tubular joint member extending from said first end toward and wrapped around said second end, where said sleeve near said first end includes at least one continuous upstanding annular rib to be compressed about said tubular member, and said sleeve near said second end includes at least one continuous upstanding external rib to be compressed against the complementary opening of said second member, and
   (c) means for changing the diameter of said tubular joint member, said means including a first member for incrementally decreasing the diameter of said first end to compress said coupling about said tubular member, and a second member for incrementally increasing the diameter of said second end to compress said coupling against said complementary opening of said second member.

2. The circular mechanical coupling according to claim 1, wherein there are two sets of plural upstanding annular ribs, and that the radial height of each set increases from the respective ends of said coupling.

3. The circular mechanical coupling according to claim 1, wherein said first and second members include threaded members for incrementally changing the diameter of the coupling.

4. The circular mechanical coupling according to claim 1, wherein said second member having a complementary opening is a manhole and said opening is in the wall thereof.

5. The circular mechanical coupling according to claim 4, wherein said wall has a predetermined thickness and there are plural upstanding, parallel, external ribs near said second end of said sleeve, where the lateral breadth of said ribs is substantially equal to said predetermined thickness.

6. The circular mechanical coupling according to claim 1, wherein said second member having a complementary opening is a pipe.

7. The circular mechanical coupling according to claim 1, wherein said sheet like member is a single sheet formed into a circular configuration.

8. The circular mechanical coupling according to claim 1, wherein said sheet like member includes at least two arcuate shaped members joined at their respective ends and formed into a circular configuration.

9. The circular mechanical coupling according to claim 1, wherein a bridging member in the form of an elongated, arcuate shaped sheet like member secured at one end thereof to said tubular joint member, and positioned to underlie said continuous elastomeric sleeve near said second end.

* * * * *